(12) United States Patent
Beneker et al.

(10) Patent No.: US 8,316,888 B2
(45) Date of Patent: Nov. 27, 2012

(54) FLUID-BIASED HYDRAULIC CONTROL VALVE

(75) Inventors: Gerrit VanVranken Beneker, Lake Orion, MI (US); Robert Dean Keller, Davisburg, MI (US)

(73) Assignee: Eaton Corporation, Cleveland, OH (US)

( * ) Notice: Subject to any disclaimer, the term of this patent is extended or adjusted under 35 U.S.C. 154(b) by 771 days.

(21) Appl. No.: 12/486,035

(22) Filed: Jun. 17, 2009

(65) Prior Publication Data

US 2010/0320407 A1 Dec. 23, 2010

(51) Int. Cl.
*F16K 11/048* (2006.01)
(52) U.S. Cl. ............... 137/625.26; 137/625.65; 251/82; 251/129.19
(58) Field of Classification Search .............. 137/625.65, 137/625.26, 625.27, 625.25; 251/129.14, 251/82, 129.19; 123/90.1, 90.11, 90.12, 123/90.33
See application file for complete search history.

(56) References Cited

U.S. PATENT DOCUMENTS

| | | | |
|---|---|---|---|
| 3,595,265 A * | 7/1971 | Cryder et al. | 137/513.5 |
| 4,762,000 A | 8/1988 | Bond, Jr. | |
| 6,206,038 B1 | 3/2001 | Klein et al. | |
| 6,776,131 B2 | 8/2004 | Dietz | |
| 7,137,411 B2 * | 11/2006 | Golovatai-Schmidt et al. | 137/625.65 |
| 7,243,680 B2 * | 7/2007 | Golovatai-Schmidt et al. | 137/596.17 |
| 7,481,242 B2 * | 1/2009 | Golovatai-Schmidt .. | 137/625.65 |
| 7,971,607 B2 * | 7/2011 | Ross et al. | 137/625.65 |
| 2005/0212533 A1 | 9/2005 | Itomi | |
| 2008/0093172 A1 | 4/2008 | Albertson et al. | |
| 2008/0196777 A1 | 8/2008 | Ross et al. | |
| 2008/0250851 A1 | 10/2008 | Keller | |
| 2009/0189104 A1 | 7/2009 | Bamber | |
| 2011/0089350 A1 * | 4/2011 | Beneker et al. | 251/129.15 |

FOREIGN PATENT DOCUMENTS

| | | |
|---|---|---|
| DE | 2835749 A1 | 2/1979 |
| DE | 4125588 A1 | 2/1993 |
| DE | 19902991 C1 | 7/2000 |
| DE | 20012614 U1 | 11/2000 |
| DE | 10242959 A1 | 11/2003 |
| DE | 10223431 A1 | 12/2003 |
| DE | 102005034938 A1 | 2/2007 |
| EP | 1876380 A1 | 1/2008 |
| FR | 1188623 A | 9/1959 |
| GB | 1258416 A | 12/1971 |
| GB | 2352495 A | 1/2001 |
| WO | 8603297 | 6/1986 |
| WO | 9113322 | 9/1991 |
| WO | 2005102807 A1 | 11/2005 |
| WO | 2010146447 A2 | 12/2010 |

* cited by examiner

*Primary Examiner* — Craig Schneider
(74) *Attorney, Agent, or Firm* — Quinn Law Group, PLLC

(57) ABSTRACT

A hydraulic control valve is provided having a solenoid body, an energizable coil, and an armature positioned adjacent the coil. A valve stem extends from the armature. The coil is energizable to move the armature and the valve stem from a first position to a second position. The valve body, the armature and the valve stem are configured so that the armature and the valve stem are biased to the first position by pressurized fluid, allowing the armature to operate without a biasing spring.

20 Claims, 2 Drawing Sheets

FLUID-BIASED HYDRAULIC CONTROL VALVE

TECHNICAL FIELD

The present invention relates to an electrically operated hydraulic control mechanism such as a solenoid valve.

BACKGROUND OF THE INVENTION

Solenoid control valves for hydraulic control systems are used to control oil under pressure that may be used to switch latch pins in switching lifters and lash adjusters in engine valve systems. Valve lifters are engine components that control the opening and closing of exhaust and intake valves in an engine. Lash adjusters may also be used to deactivate exhaust and intake valves in an engine. Engine valves may be selectively deactivated or locked out to disable operation of some cylinders in an engine when power demands on an engine are reduced. By deactivating cylinders, fuel efficiency of an engine may be improved.

Engine deactivating solenoid control valves must operate with minimum response times to maximize engine efficiency. Valve response times include valve activation response times and deactivation response times. Solenoid control valves apply a magnetic force to an armature that moves a control valve stem by activating a coil to move the armature against a biasing force that is typically provided by a spring. The magnetic force applied by the solenoid to the armature and in turn to the control valve stem should be maximized to reduce response time. The magnetic force applied by the coil can be increased by increasing the size of the coil. However, cost and weight reduction considerations tend to limit the size of the coil. Deactivation response times are adversely impacted by valve closure biasing springs, the force of which must be overcome before the valve is opened. While this delay in response times in most applications is minimal, in variable valve actuation systems, the limited time window for valve activation and deactivation is critical and must be minimized.

SUMMARY OF THE INVENTION

A hydraulic control valve is provided having a solenoid body, an energizable coil, and an armature positioned adjacent the coil. A valve stem extends from the armature. The coil is energizable to move the armature and the valve stem from a first position to a second position. The first position may be a deenergized, closed position, and the second position may be an energized, open position. The valve body, the armature and the valve stem are configured so that the armature and the valve stem are biased to the first position by pressurized fluid, allowing the armature to operate without a biasing spring. Thus, the armature is configured so that the net fluid forces contribute to closing the valve, providing a relatively quick valve actuation response time. If no biasing spring is used, cost and assembly time, as well as response time, are minimized. Additionally, the solenoid may be weaker, and therefore less expensive, as no spring biasing force needs to be overcome.

In one embodiment, the armature and the valve stem include a first poppet and a second poppet, and the valve body defines a supply chamber with a first seat, a second seat, and a control chamber between the first and second seats. The first poppet is configured to sit at the first seat and the second poppet is configured to be spaced from the second seat in the first position to prevent pressurized fluid flow past the first seat and to exhaust fluid from the control chamber past the second seat. The first poppet is configured to be spaced from the first seat and the second poppet is configured to sit at the second seat in the second position to permit flow of pressurized fluid from the supply chamber to the control chamber and prevent flow from the control chamber to the exhaust chamber.

The hydraulic control valve may be mounted to an engine such that the armature falls to the second position when the engine is off and the coil is not energized, thereby moving the first poppet off of the seat to open the supply chamber to the control chamber. Thus, due to gravity, the armature is in the same position as the energized, engine—on position when the engine is off and the coil is not energized. When the engine is subsequently restarted, with the coil still deenergized, air can thereby expel from the supply chamber to the control chamber, and further to the exhaust when the armature and valve stem move to the first position due to pressurized oil acting on the second poppet. Expelling any air in the system enables a quicker, more controlled response of the valve.

A hydraulic control circuit is provided with an electromagnetic actuator selectively actuatable to create a flux path, a valve body having a seat past which a fluid under pressure is selectively permitted to flow, and an armature that is selectively moved in a first direction by electromagnetic flux. The armature defines a poppet that is moved in the first direction relative to the seat from a closed position in which fluid flow past the seat is prevented to an open position in which fluid flow past the seat is permitted, the armature being biased to the closed position by operation of the fluid under pressure.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
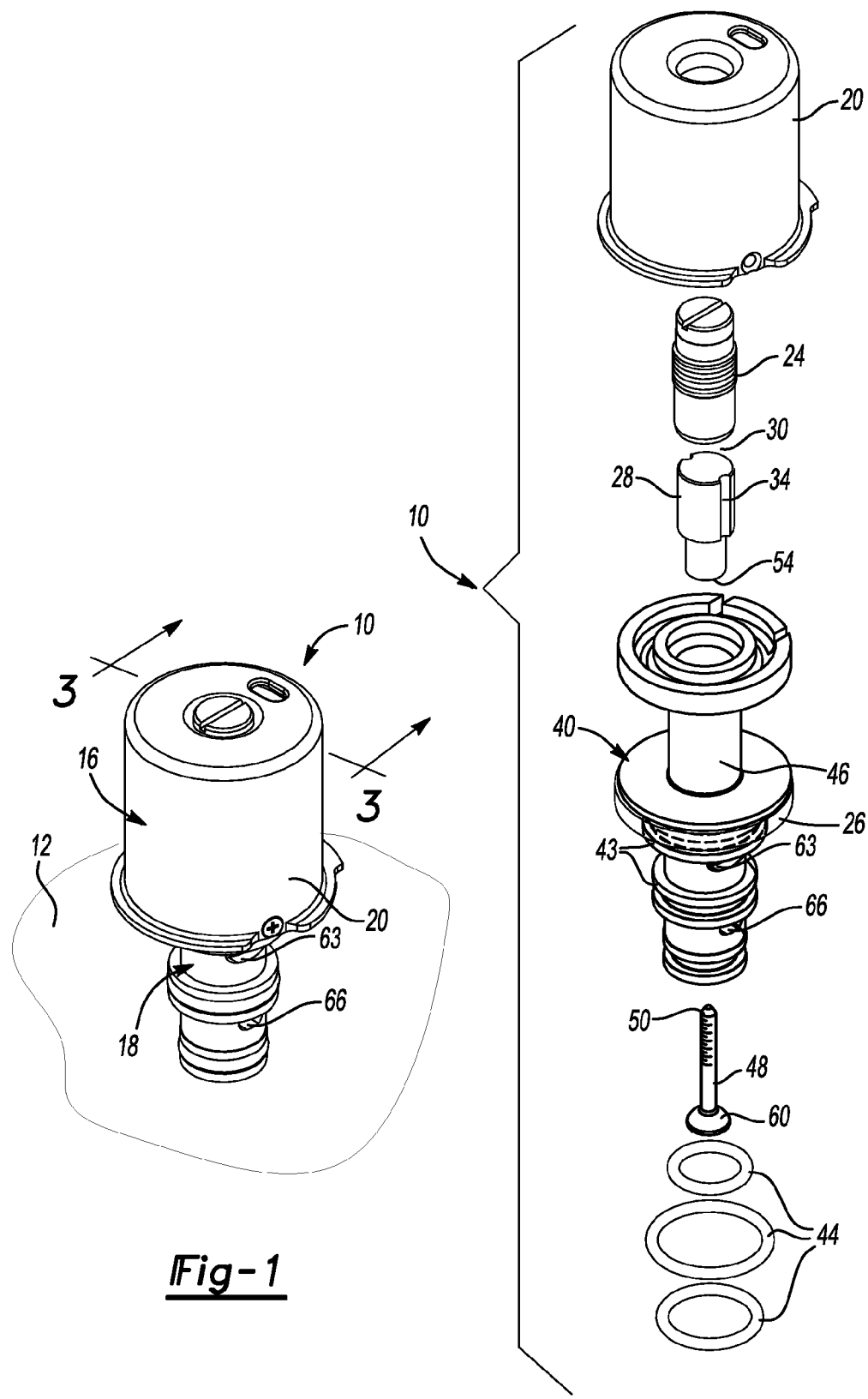
FIG. 1 is a perspective view of a solenoid valve.
FIG. 2 is an exploded perspective view of the solenoid valve shown in FIG. 1.

Referring to FIG. 1, a solenoid valve 10, for example, such as that used to deactivate lifters or operate a dual lift system in an internal combustion engine or diesel engine is illustrated. The solenoid valve 10 may also be referred to as an electromagnetic actuator. The solenoid valve 10 is installed in an engine 12. The solenoid valve 10 includes a solenoid portion 16 and a valve body 18.

Figure 3:
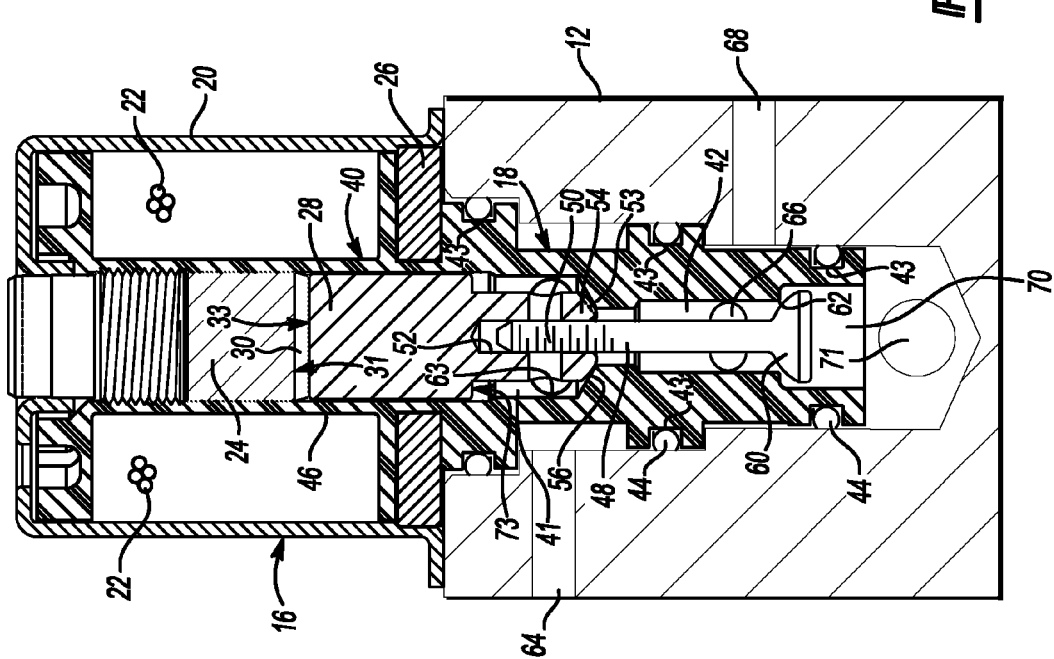
FIG. 3 is a partial cross-sectional view taken along the plane of section line 3-3 in FIG. 1 showing the valve in a first, closed and deenergized position.

Referring to FIGS. 2 and 3, the solenoid valve 10 is shown to include a solenoid can 20 that houses a coil 22 that powers the solenoid valve 10. A pole piece 24 is assembled within the solenoid can 20. The pole piece 24 defines part of the flux path for the coil 22. A flux collector insert 26 is disposed within the solenoid can 20 and also forms part of the flux path for the coil 22.

Figure 4:
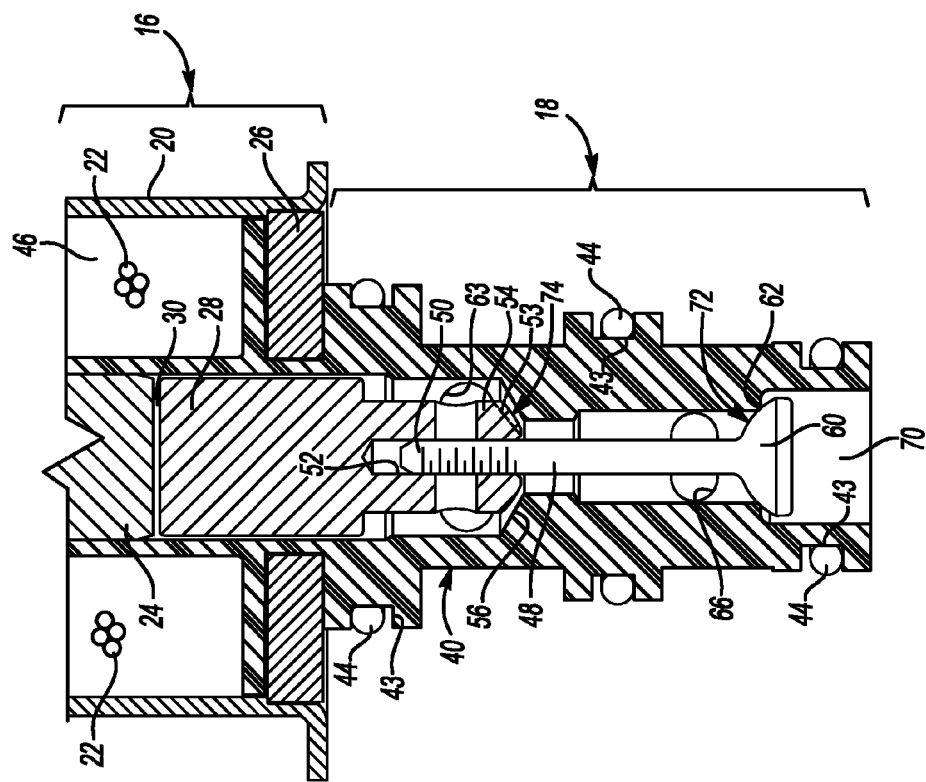
FIG. 4 is a partial cross-sectional view similar to FIG. 3 of the valve in a second, open and energized position.

An armature 28 is acted upon by the flux created by energizing the coil 22 to shift the solenoid valve 10 from a normally closed position as shown in FIG. 3 to the open position as shown in FIG. 4. An air gap 30 is provided between a radially-extending face 31 of the pole piece 24 and a radially-extending face 33 of the armature 28. The air gap 30 may be adjusted by adjusting the pole piece 24 relative to the armature 28. A relief groove 34, shown in FIG. 2, is provided in the armature 28 that facilitates flow of oil under pressure axially across the armature 28. The relief groove 34 is also referred to as a conduit. Alternatively, a conduit may be formed in the valve body 18 adjacent the armature 28 to provide flow of pressurized oil across the armature 28. The flux collector insert 26 may be inserted adjacent to the coil 22 and the valve body 18 in a molded one-piece or multiple-piece body 40.

The valve body 18 defines an oil intake chamber 41, also referred to as a supply chamber, in which the armature 28 is disposed and that initially receives oil under pressure. The valve body also defines an intermediate chamber 42, also referred to as a control chamber. A plurality of O-ring grooves 43 are provided on the exterior of the valve body 18 that each receives one of a plurality of seals 44. The seals 44 establish a seal between the valve portion 18 and the engine 12. The molded body 40 defines an internal coil receptacle 46, or bobbin, that extends into the solenoid portion 16. The coil 22 is shown only in part, but it is understood that the coil 22 fills the coil receptacle 46. The body 40 may be formed as a one-piece integral plastic molded part, as illustrated, or could be formed in pieces and assembled together. The coil 22 is wrapped around the coil receptacle 46.

A valve stem 48 has a portion 50 that is received within an opening 52 in the armature 28. The position of the control valve stem 48 may be adjusted relative to the armature 28 by a threaded connection or by a press-fit between the stem 48 and the armature 28. The armature 28 includes a poppet 54 that is moved relative to the valve seat 56 in response to pressure changes, as will be more fully described below. An exhaust poppet 60 is provided on one end of the control valve stem 48 to move relative to a valve seat 62 to open and close an exhaust port 70.

A supply gallery 64 is provided in the engine 12 to provide pressure $P_1$ to the oil intake chamber 41 that is defined in the valve body 18. A control gallery 68 is provided in the engine 12 that is normally maintained at control pressure $P_2$. An exhaust gallery 71, also provided in the engine, is in communication with the exhaust port 70 and is ported to ambient pressure and may be referred to as "$P_0$". The intermediate chamber 42 goes to Pressure $P_0$ when the exhaust port 70 is opened.

Referring to FIG. 4, the solenoid valve 10 is shown in the open position. The coil 22 is energized to retract the armature 28 toward the coil 22. The poppet 54 opens the valve seat 56 to provide pressure $P_1$ from the oil intake chamber 41 to the intermediate chamber 42, and the exhaust poppet 60 sits at seat 62 to close the exhaust port 70.

Referring to FIGS. 2-4, the valve body 18 includes a supply opening 63 that receives oil under pressure from a supply gallery 64 that is in communication with the oil intake chamber 41 and the valve seat 56. When the valve seat 56 is open, the intake chamber 41 is in communication with the intermediate chamber 42. Oil under pressure is provided through an outlet opening 66, also referred to as a control port, and to a control gallery 68. An exhaust port 70 is provided at the inboard end of the valve body 40. Exhaust port 70 is in communication with exhaust gallery 71.

In operation, the valve 10 is normally closed as shown in FIG. 3 and is shifted to its open position as shown in FIG. 4 by energizing the coil 22. The coil 22, when energized, reduces the air gap 30 formed between the pole piece 24 and the armature 28. The armature 28 is shifted toward the pole piece 24 by electromagnetic flux created by the coil 22. Oil in chamber 41 is in communication with the gap 30 through the relief groove 34.

When in the normally closed position shown in FIG. 3, the poppet 54 closes the valve seat 56, isolating the oil intake chamber 41, which is at $P_1$, from the intermediate chamber 42, which is at $P_2$. The oil under pressure in the oil intake chamber 41 biases the poppet 54 against the valve seat 56. The area of the armature 28 affected by $P_1$ biases the armature to the closed position as $P_1$ acts on the larger surface area of face 33 of the armature 28 at the gap 30 to provide biasing force in one direction (i.e., in a direction to seat the poppet 54 at the seat 56, while pressurized fluid at $P_1$ acts on a smaller surface area 73 of the armature in the chamber 41 in an opposing direction. The biasing force applied to the poppet 54 is intended to eliminate the need for a spring. Alternatively, a spring (not shown) may be incorporated to increase the biasing force applied to the poppet 54.

When the coil 22 is energized, flux through the pole piece 24 and flux collector insert 26 pulls the armature 28 toward the pole piece 24, as shown in FIG. 4. The face-to-face orientation of the armature 28 relative to the pole piece 24 subjects the armature 28 to exponentially greater magnetic force. Shifting the armature 28 causes the poppet 54 to open relative to the valve seat 56, thereby providing pressure $P_1$ from the oil intake chamber 41 to the intermediate chamber 42. The intermediate chamber 42 is normally maintained at pressure $P_2$ but is increased to $P_1$ when the poppet 54 opens the valve seat 56 and the poppet 60 closes valve seat 62 to close off the exhaust port 70. Thus, $P_1$ acts on the surface area of face 33 of the armature 28 and the surface area 72 of the poppet 54 in one direction and on annular surface area 73 and surface area 74 of poppet 54 in an opposing direction. Because the affected surface area 33 is equal to the combined surface areas 73 and 74, the net force is that on surface area 72. This change in pressure increases the hydraulic pressure supplied to the engine valve system to $P_1$. When the pressure provided to the engine valve system changes to $P_1$, selected engine valves may be deactivated by latch pins, lash adjusters or another controlled device (not shown) to thereby deactivate selected cylinders of the engine.

When the coil 22 is subsequently deenergized, with the forces due to the flux removed (i.e., the net force pulling the armature 28 toward the pole piece 24), the net fluid pressure on surface area 33 drives the armature 28 to the normally closed, deenergized position of FIG. 3. Thus, the armature 28 is configured so that the net fluid forces (i.e., net downward force acting on face 72) contributes to closing the valve 10, with the chamber 42 exhausting to exhaust port 70, thereby providing relatively quick valve actuation response time from the energized to the deenergized position.

The valve 10 is provided with an air purging and self-cleaning feature. Specifically, the armature 28 is formed with a bypass slot 53, also referred to as a bypass channel, to permit a limited amount of oil to move from chamber 41 to chamber 42 when the valve 10 is closed, bypassing the seat 56. Alternatively, the bypass slot may be provided in the body 18 adjacent the seat 56. The slot 53 also allows particles of dirt to be expelled from chamber 41 with the oil, and thus functions as a "self-cleaning" feature of the valve. Additionally, air is purged from the chamber 41 through slot 53, thus preventing an air cushion acting against valve 10 moving to the energized position of FIG. 4 when the coil 22 is subsequently energized. This allows quick transitioning from the deenergized to the energized position.

When the engine 12 is off so that no fluid pressure is provided in the valve 10 and the coil 22 is deenergized, assuming that the valve 10 is installed in the engine 12 with the armature 28 above the pole piece plug 24 (i.e., upside down with respect to the view shown in FIGS. 3 and 4), gravity will cause the armature 28 to fall to the energized position of FIG. 4 (although the coil is not energized). Thus, when the engine 12 is started, pressurized oil will come up the supply gallery 64 and force any air ahead of it out of the supply chamber 41 to the control chamber 42, past the open seat 56 as the oil proceeds into chamber 41 and gap 30, biasing the armature 28 to the closed, deenergized position of FIG. 3. The air is expelled from chamber 42 to exhaust port 70 as the poppet 62 unseats.

While the best modes for carrying out the invention have been described in detail, those familiar with the art to which this invention relates will recognize various alternative designs and embodiments for practicing the invention within the scope of the appended claims.

The invention claimed is:

1. A hydraulic control valve comprising:
a solenoid body;
a selectively energizable coil;
an armature positioned adjacent the coil and having a valve stem extending therefrom; the coil being energizable to move the armature and the valve stem from a first position to a second position;
wherein the valve body, the armature and the valve stem are configured so that the armature and the valve stem are biased to the first position by pressurized fluid;
a pole piece positioned to establish a gap between the pole piece and the armature;
wherein the armature is configured to route pressurized fluid between the gap and a side of the armature opposite the pole piece and the gap; and wherein a first area of the armature exposed to pressurized fluid in the gap is greater than a second area of the armature exposed to pressurized fluid at the side of the armature opposite the gap, the armature thereby being biased away from the pole piece by the fluid.

2. The hydraulic control valve of claim 1, wherein the hydraulic control valve is characterized by the absence of a spring biasing the armature and valve stem to the first position.

3. The hydraulic control valve of claim 1, wherein an area of the valve exposed to fluid force biasing the valve to the first position increases as the valve transitions from the second position to the first position and the gap between the armature and the pole piece increases.

4. The hydraulic control valve of claim 1, wherein the armature and the valve stem include a first poppet and a second poppet; wherein the valve body defines a supply chamber with a first seat, a second seat, and a control chamber between the first and second seats; wherein the first poppet is configured to sit at the first seat and the second poppet is configured to be spaced from the second seat in the first position to substantially prevent pressurized fluid flow past the first seat and to exhaust fluid from the control chamber past the second seat; and wherein the first poppet is configured to be spaced from the first seat and the second poppet is configured to sit at the second seat in the second position to permit flow of pressurized fluid from the supply chamber to the control chamber and prevent flow from the control chamber to an exhaust port.

5. The hydraulic control valve of claim 4, wherein the first poppet and the second poppet are held in a fixed spatial relationship by the valve stem.

6. The hydraulic control valve of claim 4, in combination with an engine; wherein the hydraulic control valve is mounted to the engine such that the armature falls to the second position when the engine is off and the coil is not energized, thereby moving the first poppet off of the first seat to open the supply chamber to the control chamber, air thereby expelling from the supply chamber to the control chamber when the engine is off and the coil is not energized, and the air further expelling to the exhaust port when the armature and valve stem move to the first position when the engine is restarted.

7. The hydraulic control valve of claim 6, wherein the armature is configured so that an additional area of the second poppet is exposed to pressurized fluid when the armature transitions from the second position to the first position, thereby biasing the armature to the first position.

8. The hydraulic control valve of claim 6, wherein one of the valve body and the first poppet form a bypass channel at the first seat, allowing air to bleed from the supply chamber to the control chamber through the bypass channel when the valve is in the first position.

9. A hydraulic control circuit comprising:
an electromagnetic actuator selectively actuatable to create a flux path, the actuator including
a valve body having a first seat past which fluid under pressure is selectively permitted to flow;
an armature that is selectively moved in a first direction by electromagnetic flux, the armature defining a poppet that is moved in the first direction relative to the first seat from a closed position in which fluid flow past the first seat is substantially prevented to an open position in which fluid flow past the first seat is permitted, the armature being biased to the closed position by operation of the fluid under pressure; and
a pole piece positioned to establish a gap between the pole piece and the armature; wherein the armature is configured to route pressurized fluid between the gap and a side of the armature opposite the pole piece and the gap; wherein a first area of the armature exposed to pressurized fluid in the gap is greater than a second area of the armature exposed to pressurized fluid at the side of the armature opposite the gap, the armature thereby being biased away from the pole piece and to the closed position by the pressurized fluid.

10. The hydraulic control circuit of claim 9, wherein the electromagnetic actuator is a solenoid valve that includes a coil that is energizable to create the flux.

11. The hydraulic control circuit of claim 9, wherein the valve body defines a first chamber to which the pressurized fluid is provided through a supply port; wherein the valve body further defines a second chamber from which fluid exhausts to an exhaust port; and wherein the second chamber is in fluid flow communication with the first chamber when fluid is permitted to flow past the first seat.

12. The hydraulic control circuit of claim 11, wherein the armature is connected to a valve stem that defines a second poppet that is moved with the armature relative to the exhaust port so that the second poppet closes the exhaust port when the first poppet is in the open position and opens the exhaust port when the first poppet is in the closed position.

13. The hydraulic control circuit of claim 9, wherein the poppet is a first poppet; wherein the valve body defines a second seat; wherein the armature is connected to a valve stem that defines a second poppet that is moved with the armature in the first direction relative to the second seat from a first position in which fluid flow past the second seat is permitted to a second position in which fluid flow past the second seat is prevented; and wherein the second poppet is biased toward the first position when the armature is biased toward the closed position by the fluid under pressure.

14. The hydraulic control circuit of claim 13, wherein the first poppet and the second poppet are held in a fixed spatial relationship by the valve stem.

15. The hydraulic control circuit of claim 13, in combination with an engine; wherein the electromagnetic actuator is mounted to the engine such that the second poppet falls to the second position when the engine is off and the coil is not energized, thereby moving the first poppet off of the first seat.

16. The hydraulic control circuit of claim 13, wherein the electromagnetic actuator is characterized by the absence of a spring biasing the second poppet to the first position.

17. A hydraulic control valve comprising:
a valve body;
a selectively energizable coil;
an armature positioned adjacent the coil and having a valve stem extending therefrom; the coil being energizable to move the armature and the valve stem from a first position to a second position;
wherein the valve body, the armature and the valve stem are configured so that the armature and the valve stem are biased to the first position by pressurized fluid;
wherein the armature and the valve stem include a first poppet and a second poppet; wherein the valve body defines a supply chamber with a first seat, a second seat, and a control chamber between the first and second seats; wherein the first poppet is configured to sit at the first seat and the second poppet is configured to be spaced from the second seat in the first position to substantially prevent pressurized fluid flow past the first seat and to exhaust fluid from the control chamber past the second seat; wherein the first poppet is configured to be spaced from the first seat and the second poppet is configured to sit at the second seat in the second position to permit flow of pressurized fluid from the supply chamber to the control chamber and prevent flow from the control chamber to an exhaust port;
wherein one of the valve body and the first poppet form a bypass channel at the first seat, allowing air to bleed from the supply chamber to the control chamber through the bypass channel when the valve is in the first position;
a pole piece positioned to establish a gap between the pole piece and the armature; wherein the armature is configured to route pressurized fluid between the gap and a side of the armature opposite the pole piece and the gap; wherein a first area of the armature exposed to pressurized fluid in the gap is greater than a second area of the armature exposed to pressurized fluid at the side of the armature opposite the gap, the armature thereby being biased away from the pole piece by the fluid; and
wherein an area of the second poppet exposed to fluid force biasing the valve to the first position increases as the valve transitions from the second position to the first position and the gap between the armature and the pole piece increases.

18. The hydraulic control valve of claim 17, wherein the hydraulic control valve is characterized by the absence of a spring biasing the armature and valve stem to the first position.

19. The hydraulic control valve of claim 17, in combination with an engine; wherein the hydraulic control valve is mounted to the engine such that the armature falls to the second position when the engine is off and the coil is not energized, thereby moving the first poppet off of the first seat to open the supply chamber to the control chamber, air thereby expelling from the supply chamber to the control chamber when the engine is off and the coil is not energized, and the air further expelling to the exhaust port when the armature and valve stem move to the first position when the engine is restarted.

20. The hydraulic control valve of claim 17, wherein the first poppet and the second poppet are held in a fixed spatial relationship by the valve stem.

* * * * *